(12) United States Patent
Münz et al.

(10) Patent No.: US 10,416,620 B2
(45) Date of Patent: Sep. 17, 2019

(54) METHOD AND CONTROL DEVICE FOR ROBUST OPTIMIZATION OF AN ELECTRICITY GRID

(71) Applicant: Siemens Aktiengesellschaft, München (DE)

(72) Inventors: Ulrich Münz, München (DE); Amer Mesanovic, München (DE)

(73) Assignee: SIEMENS AKTIENGESELLSCHAFT (DE)

(*) Notice: Subject to any disclaimer, the term of this patent is extended or adjusted under 35 U.S.C. 154(b) by 245 days.

(21) Appl. No.: 15/473,663

(22) Filed: Mar. 30, 2017

(65) Prior Publication Data

US 2017/0288404 A1 Oct. 5, 2017

(30) Foreign Application Priority Data

Apr. 1, 2016 (EP) .................................... 16163535

(51) Int. Cl.
*G05B 13/04* (2006.01)
*H02J 3/36* (2006.01)
*H02J 3/00* (2006.01)

(52) U.S. Cl.
CPC ............. *G05B 13/041* (2013.01); *H02J 3/36* (2013.01); *H02J 2003/007* (2013.01); *Y02E 60/60* (2013.01); *Y02E 60/76* (2013.01); *Y04S 40/22* (2013.01)

(58) Field of Classification Search
CPC . G05B 15/02; G05B 13/041; H02J 2003/007; H02J 3/06; H02J 3/36; H02J 3/382
USPC .................................................. 700/291, 295
See application file for complete search history.

(56) References Cited

U.S. PATENT DOCUMENTS

| 6,681,156 | B1* | 1/2004 | Weiss | G06Q 40/04 |
| | | | | 700/291 |
| 9,496,717 | B2* | 11/2016 | Rasmussen | H02J 3/40 |
| 2003/0011348 | A1* | 1/2003 | Lof | H02J 3/381 |
| | | | | 322/37 |
| 2011/0018502 | A1* | 1/2011 | Bianciotto | H02J 7/045 |
| | | | | 320/162 |
| 2016/0094031 | A1 | 3/2016 | Münz | |
| 2016/0344234 | A1* | 11/2016 | Hund | G06Q 10/0631 |

(Continued)

FOREIGN PATENT DOCUMENTS

EP 2645553 A2 10/2013

OTHER PUBLICATIONS

Wiget R. et al: Probabilistic Security Constrained Optimal Power Flow for a Mixed HVAC and HVDC Grid with Stochastic Infeed, Power Systems Computation Conference 2014, pp. 1-7.

*Primary Examiner* — Chun Cao
(74) *Attorney, Agent, or Firm* — Schmeiser, Olsen & Watts LLP

(57) ABSTRACT

An electricity grid is provided including an AC electricity grid and a DC electricity grid coupled thereto via a converter, a first load flow in the AC electricity grid is modeled by a first load flow model and a second load flow in the DC electricity grid is modeled by a second load flow model. The converter controls an active power flow between the AC electricity grid and the DC electricity grid in dependence on a grid voltage of the DC electricity grid, wherein this dependence is adjustable in a control characteristic of the converter by a first coupling parameter.

13 Claims, 2 Drawing Sheets

(56) References Cited

U.S. PATENT DOCUMENTS

2017/0025859 A1\* 1/2017 Garcia ................ H02J 3/16
2018/0145579 A1\* 5/2018 Spudic ................ H02M 1/12

\* cited by examiner

METHOD AND CONTROL DEVICE FOR ROBUST OPTIMIZATION OF AN ELECTRICITY GRID

CROSS-REFERENCE TO RELATED APPLICATION

This application claims priority to European Application No. 16163535.4 having a filing date of Apr. 1, 2016 the entire contents of which are hereby incorporated by reference.

FIELD OF TECHNOLOGY

Contemporary electricity grids generally comprise a multiplicity of grid components such as, for example, power generators, consumer loads, power lines, control devices, power plants, wind power installations, photovoltaic installations and/or other conventional or renewable energy sources. In this case, the electricity grids may be, for example, power supply networks, transmission networks, distribution networks or infeed networks.

BACKGROUND

At present the proportion of renewable energy generation, in particular by wind power installations and photovoltaic installations, is increasing considerably. Such renewable energy generators are generally installed where wind and sun are available and are not primarily installed in the vicinity of load centers—as is customary in the case of conventional power plants. Therefore, regeneratively generated electricity often has to be transmitted over large distances. DC electricity grids are often more cost-effective and more efficient for such transmissions. Intensified additional construction of DC electricity grids is giving rise in many places to mixed AC/DC electricity grids, the control of which is becoming increasingly more complex, in particular insofar as a renewably generated power is generally subjected to greater fluctuations than conventionally generated power.

Short-term changes in energy generation or in energy consumption can be compensated for by a so-called primary control power. Furthermore, converters arranged between AC electricity grids and DC electricity grids can perform power shifts between these grids.

A method for optimizing load flows in mixed AC/DC electricity grids is known from the article "Probabilistic security constrained optimal power flow for a mixed HVAC and HVDC grid with stochastic infeed" by R. Wiget et al. at the Power Systems Computation Conference 2014. In this method, however, a respective load flow is optimized only taking into account stochastic load and generation changes.

SUMMARY

An aspect relates to a method, a control device, a computer program product (non-transitory computer readable storage medium having instructions, which when executed by a processor, perform actions) and also a computer-readable storage medium for controlling an electricity grid comprising an AC electricity grid and a DC electricity grid which allow a more efficient control of the electricity grid.

This aspect is achieved by a method having the features of the embodiments of the invention, by a control device having the features as hereinafter set forth, by a computer program product (non-transitory computer readable storage medium having instructions, which when executed by a processor, perform actions), and also by a computer-readable storage medium.

According to embodiments of the invention, for controlling an electricity grid comprising an AC electricity grid and a DC electricity grid coupled thereto via a converter, a first load flow in the AC electricity grid is modeled by a first load flow model and a second load flow in the DC electricity grid is modeled by a second load flow model. The converter controls an active power flow between the AC electricity grid and the DC electricity grid in dependence on a grid voltage of the DC electricity grid, wherein this dependence is adjustable in a control characteristic of the converter by a first coupling parameter. According to embodiments of the invention, a first tolerance range for an infeed active power of a generator and/or for an active load of a consumer is read in. Furthermore, a process for robust optimization of a predefined cost function is performed using the first tolerance range as robust optimization uncertainty, wherein, by the first and second load flow models, the first and second load flows, the active power flow, the grid voltage of the DC electricity grid and also the first coupling parameter are combined and the first coupling parameter is determined in such a way that the cost function is optimized. The control characteristic of the converter is set by the first coupling parameter determined in this way.

Methods for so-called robust optimization are a specific class of numerical optimization methods which can take account of uncertain or inaccurate parameters in the optimization. In particular, in this case, first variables can be optimized in such a way that predefined constraints for an entire range of uncertain or fluctuating second variables, here for the first tolerance range, are satisfied. Such a range of uncertain second variables, in connection with methods for robust optimization, is often also referred to as robust optimization uncertainty, or as uncertainty for short.

A control device, a computer program product (non-transitory computer readable storage medium having instructions, which when executed by a processor, perform actions) and also a computer-readable storage medium are provided for carrying out the method according to embodiments of the invention.

By using a process for robust optimization together with the first tolerance range as robust optimization uncertainty, it is possible to optimize the control characteristic of the converter, even if the actual infeed active power or active load is not known accurately beforehand or is subjected to fluctuations. Consequently, it is possible to control the electricity grid generally in a stable manner particularly in the case of volatile generators and consumers. This is advantageous particularly in the case of mixed AC/DC electricity grids with multi-terminal DC electricity grids.

The optimization of the control characteristic of the converter can also increase the stability of the electricity grid insofar as the electricity grid can be operated in a controlled manner within its operating limits for certain time intervals even without direct intervention of the control device. Such a control requires only a low communication overhead between the grid elements involved.

Advantageous embodiments and developments of the invention are specified in the dependent claims.

According to one advantageous embodiment of the invention, a second tolerance range for a grid frequency of the AC electricity grid, for a grid voltage of the DC electricity grid and/or for a line capacity utilization in the electricity grid can be read in. The process for robust optimization can then be performed with the second tolerance range as a constraint. In this case, the second tolerance range can be specified e.g. as an interval within which the grid frequency, the grid voltage of the DC electricity grid and/or the line capacity utilization must or ought to lie. The process for robust optimization makes it possible to satisfy the constraint represented by the second tolerance range for infeed active powers or active loads fluctuating over the entire first tolerance range.

According to one advantageous embodiment of the invention, the active power flow can be controlled in dependence on a grid frequency of the AC electricity grid, wherein this dependence is adjustable in the control characteristic of the converter by a second coupling parameter. The grid frequency and also the second coupling parameter can be included in the process for robust optimization by the first and second load flow models, and the second coupling parameter can be determined in such a way that the cost function is optimized. The control characteristic of the converter can then be set by the second coupling parameter determined in this way. This is advantageous insofar as a further degree of freedom in the electricity grid can be optimized with the second coupling parameter, which generally leads to better optimization results.

An infeed active power of a generator in the AC electricity grid can furthermore be controlled in dependence on a grid frequency of the AC electricity grid, wherein this dependence is adjustable in a control characteristic of the generator by a third coupling parameter. The infeed active power of the generator and also the third coupling parameter can be included in the process for robust optimization by the first load flow model, in that the third coupling parameter can be determined in such a way that the cost function is optimized. The control characteristic of the generator can then be set by the third coupling parameter determined in this way.

Analogously thereto, an infeed active power of a generator in the DC electricity grid can be controlled in dependence on a grid voltage of the DC electricity grid, wherein this dependence is adjustable in a control characteristic of the generator by a fourth coupling parameter. The infeed active power of the generator and also the fourth coupling parameter can be included in the process for robust optimization by the second load flow model, and the fourth coupling parameter can be determined in such a way that the cost function is optimized. The control characteristic of the generator can then be set by the fourth coupling parameter determined in this way.

As already mentioned above, this is advantageous insofar as a further degree of freedom in the electricity grid can be optimized with the third or respectively fourth coupling parameter, which generally leads to better optimization results. In particular, an infeed of generators can be optimized.

According to one advantageous embodiment of the invention, the control of the active power flow and/or of an infeed active power can be carried out by a proportional controller. Such a proportional controller is often also referred to as a P-controller and allows control that can be modeled and optimized particularly simply. The proportional controller can control the active power flow or the infeed active power in linear dependence on the grid voltage of the DC electricity grid and/or on the grid frequency of the AC electricity grid. The linear dependencies of this control can be mediated here in each case by the first, second, third and/or fourth coupling parameter as a proportionality constant. Such a proportionality constant is often also referred to as slope, gain factor or proportional gain of the proportional controller. Proportional controllers for controlling the infeed active power in linear dependence on the grid frequency of the AC electricity grid can also be used for modeling primary control power interventions of the generator or of the converter.

Furthermore, a present infeed active power of the generator and/or a present active load of the consumer can be included as physical operating variable in the process for robust optimization. Taking account of presently measured operating variables in this way allows the coupling parameters to be optimized in a situation-related and thus generally better manner.

In accordance with a further embodiment of the invention, an indication about a reference active power flow of the converter, about a reference grid DC voltage of the converter and/or about a reference active power of the generator as the result of the process for robust optimization is communicated to the converter and/or to the generator as setpoint value. This is advantageous insofar as further degrees of freedom in the electricity grid can be optimized with such setpoint values, which generally leads to better optimization results.

According to one advantageous embodiment of the invention, the first load flow model and/or the second load flow model comprise(s) a system of load flow equations. In particular, in this case, a load flow equation for the AC electricity grid can be approximated by a so-called DC load flow equation for AC electricity grids, which simplifies the modeling.

Furthermore, the system of load flow equations can comprise a system of linearized load flow equations. The load flow equations can be linearized, for example, by disregarding higher terms of a deviation of a grid voltage from a reference grid voltage. Linearized load flow equations can usually be handled considerably more simply than nonlinear load flow equations. Resulting linear optimization problems can generally be calculated numerically stably and faster, a multiplicity of standard programs often being available for this purpose.

Furthermore, power losses in the electricity grid, dispatch losses, primary control power losses and/or deviations between present operating variables and reference operating variables can be weighted in the cost function. Preferably, the losses indicated can be minimized.

BRIEF DESCRIPTION

Some of the embodiments will be described in detail, with reference to the following figures, wherein like designations denote like members, wherein.

DETAILED DESCRIPTION

Figure 1:
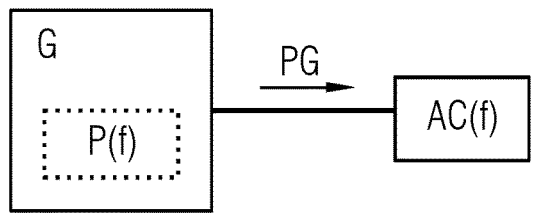
FIG. 1 shows a generator coupled to an AC electricity grid.

FIG. 1 shows a generator G coupled to an AC electricity grid AC, for example a conventional power plant for feeding active power PG into the AC electricity grid AC.

The AC electricity grid AC is operated with a grid frequency f. The active power PG is fed from the generator G into the AC electricity grid AC, that is to say that a positive active power flows from the generator G into the AC electricity grid AC.

The generator G comprises a proportional controller P(f) that regulates and controls the infeed of the active power PG in linear dependence on the grid frequency f. For the active power it holds true that $PG=PG_{ref}-KG_f*(f-f_{ref})$. In this case, $KG_f$ is a positive proportionality constant as coupling parameter for coupling the active power PG to be infed with the grid frequency f. This coupling parameter $KG_f$ is often also referred to as slope, gain factor or proportional gain of the proportional controller P(f). The coupling parameter $KG_f$ determines or influences at least one control characteristic of the proportional controller P(f) and is adjustable externally. $PG_{ref}$ denotes a reference active power or setpoint active power of the generator G. Furthermore, $f_{ref}$ denotes a reference grid frequency or setpoint grid frequency of the AC electricity grid AC. Such a proportional controller P(f) is often also referred to as P(f) droop controller.

Figure 2:
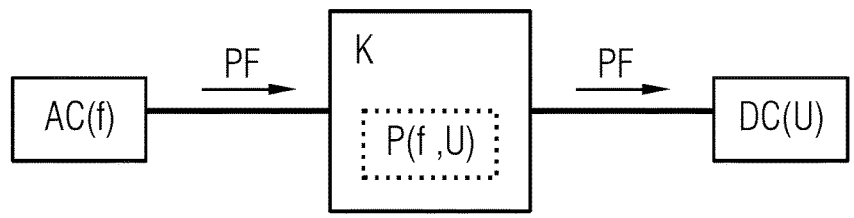
FIG. 2 shows a converter coupled to an AC electricity grid and a DC electricity grid.

FIG. 2 shows a converter K coupled to an AC electricity grid AC and to a DC electricity grid DC in a schematic illustration. The AC electricity grid AC is operated at a grid frequency f, as described above. The DC electricity grid DC has a grid voltage, that is to say a grid DC voltage U. The AC electricity grid AC and the DC electricity grid DC may be in each case, for example, power supply networks, transmission networks, distribution networks or infeed networks. They can comprise in each case a multiplicity of grid components such as, for example, power generators, conventional or renewable energy sources, power plants, photovoltaic installations, wind power installations, consumer loads and power lines.

The converter K serves for conversion between a grid AC voltage of the AC electricity grid AC and the grid DC voltage U of the DC electricity grid DC and for the energetic coupling of the AC electricity grid AC to the DC electricity grid DC. Such converters generally make it possible to freely control current and active power flows between DC electricity grids and AC electricity grids in large ranges and thus to perform large power shifts between DC and AC electricity grids.

The converter K controls and transmits an active power flow PF between the AC electricity grid AC and the DC electricity grid DC. In the present exemplary embodiment, the active power flow PF from the AC electricity grid AC to the DC electricity grid DC is chosen with positive signs. Alternatively, an opposite convention can be chosen.

The converter K has a proportional controller P(f,U) that regulates and controls the active power flow PF in linear dependence on the grid frequency f and the grid voltage U. For the active power flow this results as $PF=PF_{ref}-K_u*(U-U_{ref})+K_f*(f-f_{ref})$. $K_f$ and $K_u$ are in each case positive proportionality constants as coupling parameters for coupling the active power flow PF to the grid frequency f and the grid voltage U, respectively. Such coupling parameters are often also referred to as slope, gain factor or proportional gain of the proportional controller P(f,U). The coupling parameters $K_f$ and $K_u$ determine or influence at least one control characteristic of the proportional controller P(f,U) and are adjustable externally. $PF_{ref}$ denotes a reference active power flow or setpoint active power flow of the converter K. Furthermore, $U_{ref}$ denotes a reference grid DC voltage or setpoint grid DC voltage of the DC electricity grid DC or of the DC side of the converter K. As already explained above, $f_{ref}$ denotes the reference grid frequency or setpoint grid frequency of the AC electricity grid AC. The proportional controller P(f,U) is often also referred to as P(f,U) droop controller.

The coupling parameter $K_f$ is preferably positive since excess active power in the AC electricity grid AC leads to an increase in the grid frequency f and the excess active power can advantageously be compensated for by being fed into the DC electricity grid DC. The coupling parameter $K_u$ is preferably positive since a grid voltage U that is increased relative to the reference grid DC voltage $U_{ref}$ can advantageously be compensated for by active power being fed from the DC electricity grid DC into the AC electricity grid AC.

Figure 3:
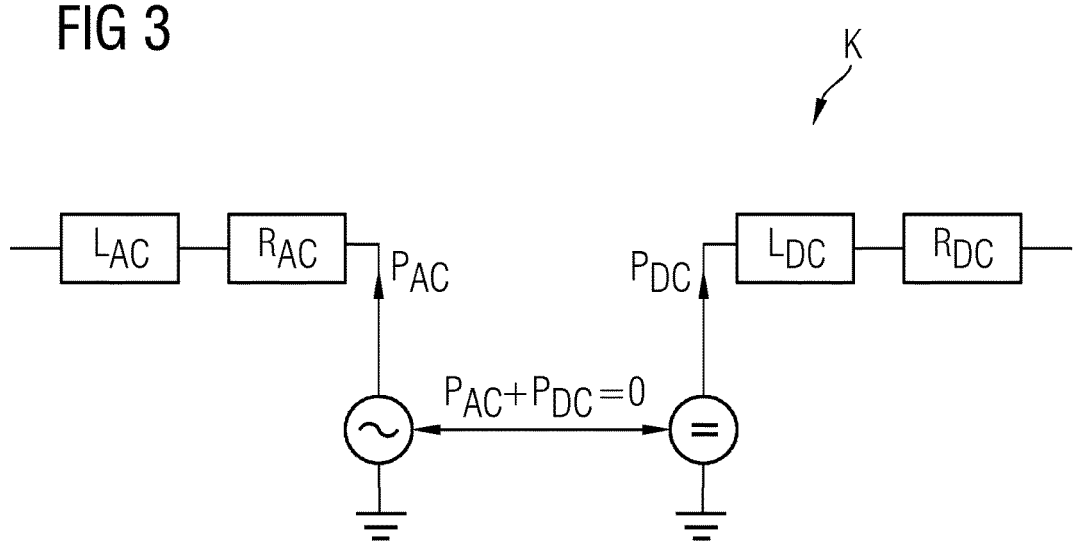
FIG. 3 shows an equivalent circuit diagram of the converter.

FIG. 3 shows an equivalent circuit diagram of the converter K in a schematic illustration. In this case, the left branch of the equivalent circuit diagram models an electrical behavior of the converter K in the AC electricity grid AC by an inductance $L_{AC}$ and a resistance $R_{AC}$ connected in series therewith. An active power flow fed into the left branch, that is to say into the AC electricity grid AC, is designated by $P_{AC}$. Analogously thereto, the right branch of the equivalent circuit diagram models an electrical behavior of the converter K in the DC electricity grid DC by an inductance $L_{DC}$ and a resistance $R_{DC}$ connected in series therewith. An active power flow fed into the right branch, that is to say into the DC electricity grid DC, is designated by $P_{DC}$. According to the above sign convention for the active power flow PF it holds true that $PF=P_{DC}=-P_{AC}$, such that for the active power balance it holds true that: $P_{DC}+P_{AC}=0$.

Figure 4:
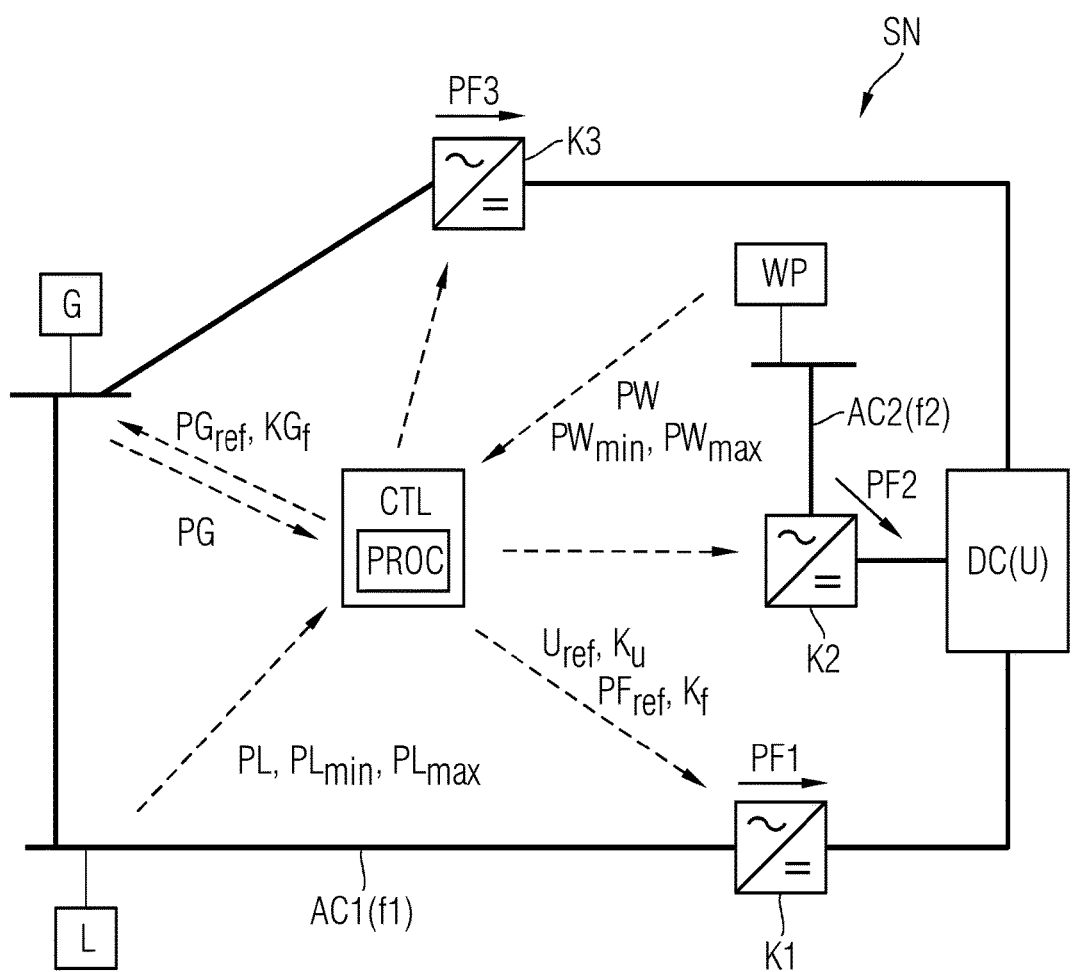
FIG. 4 shows an electricity grid with a plurality of AC electricity grids coupled via a DC electricity grid.

FIG. 4 shows an electricity grid SN comprising a plurality of AC electricity grids AC1 and AC2 coupled via a DC electricity grid DC, in a schematic illustration. The electricity grid SN may be, for example, a power supply network, transmission network, distribution network or infeed network. It can comprise a multiplicity of grid components such as, for example, power generators, conventional or renewable energy sources, power plants, photovoltaic installations, wind power installations, consumer loads and power lines. The DC electricity grid DC, for example a high-voltage direct current transmission system (HVDC transmission system), has a grid voltage U as described above. The AC electricity grid AC1 is operated with a grid frequency f1 and the AC electricity grid AC2 is operated with a grid frequency f2.

The AC electricity grid AC1 comprises a generator G, which has a P(f) proportional controller for regulating its infeed active power, as described above. Furthermore, a consumer L is present in the AC electricity grid AC1, said consumer drawing an active load from the AC electricity grid AC1.

The AC electricity grid AC2 comprises a renewable energy source WP, for example a wind power installation or a photovoltaic installation.

The AC electricity grid AC2 is coupled to the DC electricity grid DC via a converter K2. Furthermore, the AC electricity grid AC1 is coupled to the DC electricity grid DC both via a converter K1 and via a converter K3. The converters K1, K2 and K3 are configured as described above and each have in particular a P(f,U) proportional controller. Power lines of the electricity grid SN are indicated by thickened lines in FIG. 4.

For control purposes, the electricity grid SN has a control device CTL, for example a so-called control and protection system, which is often also abbreviated to CPS. The control device CTL comprises one or a plurality of processors PROC for performing all the method steps of the control device CTL.

As input variables for controlling the electricity grid SN, the control device CTL receives a multiplicity of physical operating variables from grid components of the electricity grid SN, in particular from converters, here K1, K2 and K3, from generators, here G and WP, from consumers, here L, and/or from transmission lines of the electricity grid SN.

These may be, in particular, control-engineering or design-dictated operating variables such as power, active power, reactive power, active load, grid frequency or so-called PMU measurement values such as voltage, current or phase angle. Furthermore, discrete operating variables which indicate an interruption, a short circuit or a connection of transmission lines can also be taken into account in the control.

On the basis of the acquired physical operating variables of the electricity grid SN, first load flows in the AC electricity grids AC1 and AC2 are modeled by a first load flow model and a second load flow in the DC electricity grid DC is modeled by a second load flow model. In this case, the first and second load flow models model and/or simulate a behavior of the AC electricity grids AC1 and AC2 and of the DC electricity grid DC, respectively, depending on operating variables of the respectively associated grid components. In particular, in this case, the control characteristics of the proportional controllers of the generators G and WP and of the converters K1, K2 and K3 are included in the modeling and/or simulation.

In the present exemplary embodiment, the first and second load flow models in each case comprise a system of linearized load flow equations. In particular, a respective load flow equation for the AC electricity grid AC1 and/or AC2 can be approximated by a DC load flow equation. The linearized load flow equations model a behavior—linearized around reference operating variables—of the AC electricity grids AC1, AC2 and of the DC electricity grid DC, respectively, depending on present operating variables of the respectively associated grid components. The linearization considerably simplifies a calculation of optimized parameters and other control parameters.

The converters K1, K2 and K3 are in each case realized as described in association with FIG. 2 with regard to function and implementation. The converter K1 controls and regulates an active power flow PF1 between the AC electricity grid AC1 and the DC electricity grid DC, the converter K2 controls and regulates an active power flow PF2 between the AC electricity grid AC2 and the DC electricity grid DC, and the converter K3 controls and regulates an active power flow PF3 between the AC electricity grid AC1 and the DC electricity grid DC. In this case, a respective control characteristic is adjustable by the control device CTL and is implemented in each case as described in association with FIG. 2. A data exchange between the converters K1, K2, K3 and the control device CTL is described below on the basis of the example of the converter K1 in a manner representative of the other converters K2 and K3.

In the context of the control of the electricity grid SN, present physical operating variables from grid components of the electricity grid SN, as indicated by dashed arrows, are communicated to the control device CTL. In this case, from the generator G an indication about a present active power PG which the generator G feeds into the AC electricity grid AC1 is communicated to the control device CTL. Furthermore, from the renewable energy source WP an indication about a present active power PW which the renewable energy source WP feeds into the AC electricity grid AC2 is communicated to the control device CTL. Furthermore, an indication about a present active load PL of the consumer L is communicated to the control device CTL.

Furthermore, from the renewable energy source WP an indication about a minimum expected infeed active power $PW_{min}$ of the renewable energy source WP and an indication about a maximum expected infeed active power $PW_{max}$ of the renewable energy source WP are communicated to the control device CTL. Analogously thereto, from the consumer L an indication about a minimum expected active load $PL_{max}$ of the consumer L and an indication about a maximum expected active load $PL_{max}$ of the consumer L are communicated to the control device CTL. In this case, the interval $[PW_{min}, PW_{max}]$ forms a first tolerance range for the expected infeed active power of the renewable energy source WP and the interval $[PL_{min}, PL_{max}]$ correspondingly forms a first tolerance range for the expected active load of the consumer L. In the present exemplary embodiment, the communicated first tolerance ranges $[PW_{min}, PW_{max}]$ and $[PL_{min}, PL_{max}]$ are valid typically for a period of 15 to 60 minutes. After a respective period of validity has elapsed, updated first tolerance ranges are communicated. An indication about a period of validity of a respective first tolerance range can preferably be communicated with said first tolerance range.

Furthermore, second tolerance ranges for the grid frequencies f1 and f2, for the grid DC voltage U and also for a capacity utilization of the power lines, generators and/or converters are predefined as constraints for the control of the electricity grid SN. An interval $[f_{min}, f_{max}]$ for the grid frequencies f1 and f2 and also an interval $[U_{min}, U_{max}]$ for the grid DC voltage U can preferably be predefined as second tolerance ranges. Furthermore, a reference grid frequency $f_{ref}$, e.g. 50 Hz, is predefined for the AC electricity grids AC1 and AC2.

On the basis of the communicated and currently present operating variables, in particular the indications about PG, PW, PL, U, f1, f2 and other reference variables of the AC electricity grids AC1, AC2 and of the DC electricity grid DC, load flows in the AC electricity grids AC1, AC2 are modeled on the basis of the first load flow model and load flows in the DC electricity grid DC are modeled on the basis of the second load flow model by the control device CTL. In this case, the converters K1, K2 and K3 are modeled by virtue of their P(f,U) proportional controllers. As a result, the DC electricity grid DC is coupled to the AC electricity grids AC1 and AC2 in terms of modeling. Furthermore, the generator G and its infeed active power PG are modeled by virtue of its P(f) proportional controller. Analogously thereto, an energy generator possibly present in the DC electricity grid DC can be modeled on the basis of a P(U) proportional controller.

Furthermore, possible load and generation changes or load and generation uncertainties are modeled by the first tolerance range $[PW_{min}, PW_{max}]$ for the infeed active power of the renewable energy source WP and by the first tolerance range $[PL_{min}, PL_{max}]$ for the active load of the consumer L. The actual generation and/or load can change arbitrarily within these intervals.

Finally, constraints to be complied with during operation are modeled by the second tolerance ranges for the grid frequencies f1 and f2, for the grid voltage U and for the capacity utilization of the power lines. The reference grid frequency $f_{ref}$ is preferably predefined in the modeling.

The modeled load flows, grid components, uncertainties and constraints are integrated into an optimization problem that determines the energy generation, the load flows and the coupling parameters in such a way that a predefined cost function is optimized whilst complying with the constraints. Power losses in the AC electricity grids AC1 and AC2 or in the DC electricity grid DC, dispatch losses, dispatch costs, primary control power losses and/or primary control power costs can preferably influence the cost function with predefined weighting. The cost function can then be minimized taking into account the above constraints with regard to a maximum possible frequency deviation in the AC electricity grids AC1 and AC2, a maximum permissible voltage deviation in the DC electricity grid DC and a maximum permissible line capacity utilization of all lines, generators and/or converters in the electricity grid SN.

According to embodiments of the invention, the optimization problem is numerically solved by a process for robust optimization. Such a robust optimization allows the variables sought to be optimized, wherein the above constraints are complied with across the entire first tolerance ranges. That is to say that the optimized variables do not lead to a violation of the constraints even if the infeed active power of the renewable energy source WP and the active load of the consumer L fluctuate within the first tolerance ranges.

The process for robust optimization uses, in its implementation, the first and second load flow models in order to combine the modeled and communicated load flows and active power flows PF1, PF2, PF3, PG and PW, the grid voltage U, the frequencies f1 and f2, the reference grid frequency $f_{ref}$, the reference active power flow $PF_{ref}$, the reference grid DC voltage $U_{ref}$, the reference active power $PG_{ref}$ and the coupling parameters $K_u$, $K_f$ and $KG_f$ to form a dynamic model of the electricity grid SN. In this case, the communicated first tolerance ranges [$PW_{min}$, $PW_{max}$] and [$PL_{min}$, $PL_{max}$] are used as robust optimization uncertainties and the second tolerance ranges are used as constraints.

In the course of the robust optimization, the coupling parameters $K_u$, $K_f$, $KG_f$ and also the reference active power flow $PF_{ref}$, the reference grid DC voltage $U_{ref}$ and the reference active power $PG_{ref}$ are determined in such a way that the cost function is minimized.

The optimized variables $K_u$, $K_f$, $KG_f$, $PF_{ref}$, $PG_{ref}$ and $U_{ref}$ are subsequently communicated by the control device CTL to the relevant grid components for controlling the electricity grid SN. In this case, the indication about the reference active power $PG_{ref}$ as setpoint value and the coupling parameter $KG_f$ as proportionality constant of the P(f) proportional controller of the generator G are communicated to the generator G. By the communicated coupling parameter $KG_f$, the control characteristic of the P(f) proportional controller of the generator G is set in such a way that the infeed active power thereof is controlled in accordance with: $PG=PG_{ref}-KG_f*(f1-f_{ref})$.

Correspondingly, the indication about the reference grid DC voltage $U_{ref}$ and the indication about a reference active power flow $PF_{ref}$ of the converter K1 in each case as setpoint value are communicated to the converter K1 as optimization results. Furthermore, the optimized coupling parameters $K_f$ and $K_u$ as proportionality constants of the P(f,U) proportional controller of the converter K1 are communicated. The control characteristic of the converter K1 is set by the communicated coupling parameters $K_f$ and $K_u$ in such a way that the active power flow is controlled in accordance with: $PF1=PF_{ref}-K_u*(U-U_{ref})+K_f*(f1-f_{ref})$. Analogously thereto, corresponding optimization results are also communicated to the converters K2 and K3.

The above process for robust optimization is performed again when updated first tolerance ranges are communicated to the control device CTL.

The method according to embodiments of the invention can preferably be performed in the course of operation of the electricity grid SN and in particular in real time.

By using a process for robust optimization together with the first tolerance ranges as robust optimization uncertainties, it is possible to optimize the control characteristics of the generator G and of the converters K1, K2 and K3 whilst complying with the constraints, even if the actual infeed active powers or active loads beforehand are not known accurately or are subjected to fluctuations. In this way, the electricity grid SN can be controlled generally in a stable manner in particular in the case of volatile generators and consumers. In particular, the optimization of the control characteristics increases the stability of the electricity grid insofar as the electricity grid SN can be operated within its operating limits for longer time intervals even without direct intervention of the control device CTL.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for controlling an electricity grid comprising an AC electricity grid and a DC electricity grid coupled thereto via a converter, wherein:
   a) a first load flow in the AC electricity grid is modeled by a first load flow model and a second load flow in the DC electricity grid is modeled by a second load flow model,
   b) the converter controls an active power flow between the AC electricity grid and the DC electricity grid in dependence on a grid voltage of the DC electricity grid, wherein this dependence is adjustable in a control characteristic of the converter by a first coupling parameter,
   c) a first tolerance range for an infeed active power of a generator and/or for an active load of a consumer is read in,
   d) a process for robust optimization of a predefined cost function is performed using the first tolerance range as robust optimization uncertainty, wherein, by the first and second load flow models, the first and second load flows, the active power flow, the grid voltage of the DC electricity grid and also the first coupling parameter are combined and the first coupling parameter is determined in such a way that the cost function is optimized, and
   e) the control characteristic of the converter is set by the first coupling parameter determined in this way.

2. The method as claimed in claim 1, wherein a second tolerance range for a grid frequency of the AC electricity grid, for a grid voltage of the DC electricity grid and/or for a line capacity utilization in the electricity grid is read in, and wherein the process for robust optimization is performed with the second tolerance range as a constraint.

3. The method as claimed in claim 1, wherein the active power flow is controlled in dependence on a grid frequency of the AC electricity grid, wherein this dependence is adjustable in the control characteristic of the converter by a second coupling parameter, in that the grid frequency and also the second coupling parameter are included in the process for robust optimization by the first and second load flow models,
   in that the second coupling parameter is determined in such a way that the cost function is optimized, and
   in that the control characteristic of the converter is set by the second coupling parameter determined in this way.

4. The method as claimed in claim 1, wherein an infeed active power of a generator in the AC electricity grid is controlled in dependence on a grid frequency of the AC electricity grid, wherein this dependence is adjustable in a control characteristic of the generator by a third coupling parameter, in that the infeed active power of the generator and also the third coupling parameter are included in the process for robust optimization by the first load flow model, in that the third coupling parameter is determined in such a way that the cost function is optimized, and in that the control characteristic of the generator is set by the third coupling parameter determined in this way.

5. The method as claimed in claim 1, wherein an infeed active power of a generator in the DC electricity grid is controlled in dependence on a grid voltage of the DC electricity grid, wherein this dependence is adjustable in a control characteristic of the generator by a fourth coupling parameter, in that the infeed active power of the generator and also the fourth coupling parameter are included in the process for robust optimization by the second load flow model, in that the fourth coupling parameter is determined in such a way that the cost function is optimized, and in that the control characteristic of the generator is set by the fourth coupling parameter determined in this way.

6. The method as claimed in claim 1, wherein the control of the active power flow and/or of an infeed active power is carried out by a proportional controller.

7. The method as claimed in claim 1, wherein a present infeed active power of the generator and/or a present active load of the consumer are/is included as physical operating variable in the process for robust optimization.

8. The method as claimed in claim 1, wherein an indication about a reference active power flow of the converter, about a reference grid DC voltage of the converter and/or about a reference active power of the generator as the result of the process for robust optimization is communicated to the converter and/or to the generator as setpoint value.

9. The method as claimed in claim 1, wherein the first load flow model and/or the second load flow model comprise(s) a system of load flow equations.

10. The method as claimed in claim 9, wherein the system of load flow equations comprises a system of linearized load flow equations.

11. The method as claimed in claim 1, wherein power losses in the electricity grid, dispatch losses, primary control power losses and/or deviations between present operating variables and reference operating variables are weighted in the cost function.

12. A control device configured for performing a method for controlling an electricity grid comprising an AC electricity grid and a DC electricity grid coupled thereto via a converter, wherein the method comprises:

a) a first load flow in the AC electricity grid is modeled by a first load flow model and a second load flow in the DC electricity grid is modeled by a second load flow model, b) the converter controls an active power flow between the AC electricity grid and the DC electricity grid in dependence on a grid voltage of the DC electricity grid, wherein this dependence is adjustable in a control characteristic of the converter by a first coupling parameter, c) a first tolerance range for an infeed active power of a generator and/or for an active load of a consumer is read in, d) a process for robust optimization of a predefined cost function is performed using the first tolerance range as robust optimization uncertainty, wherein, by the first and second load flow models, the first and second load flows, the active power flow, the grid voltage of the DC electricity grid and also the first coupling parameter are combined and the first coupling parameter is determined in such a way that the cost function is optimized, and e) the control characteristic of the converter is set by the first coupling parameter determined in this way.

13. A computer program product, comprising a computer readable hardware storage device having computer readable program code stored therein, said program code executable by a processor of a computer system to implement a method configured for performing a method for controlling an electricity grid comprising an AC electricity grid and a DC electricity grid coupled thereto via a converter, the method comprising:

a) a first load flow in the AC electricity grid is modeled by a first load flow model and a second load flow in the DC electricity grid is modeled by a second load flow model, b) the converter controls an active power flow between the AC electricity grid and the DC electricity grid in dependence on a grid voltage of the DC electricity grid, wherein this dependence is adjustable in a control characteristic of the converter by a first coupling parameter, c) a first tolerance range for an infeed active power of a generator and/or for an active load of a consumer is read in, d) a process for robust optimization of a predefined cost function is performed using the first tolerance range as robust optimization uncertainty, wherein, by the first and second load flow models, the first and second load flows, the active power flow, the grid voltage of the DC electricity grid and also the first coupling parameter are combined and the first coupling parameter is determined in such a way that the cost function is optimized, and e) the control characteristic of the converter is set by the first coupling parameter determined in this way.

\* \* \* \* \*